Aug. 19, 1924.

L. SARTORE 1,505,218

METHOD OF STUFFING SAUSAGE CASINGS

Filed March 26, 1924     2 Sheets-Sheet 1

INVENTOR
Laurence Sartore
BY
William B. Wharton
HIS ATTORNEY

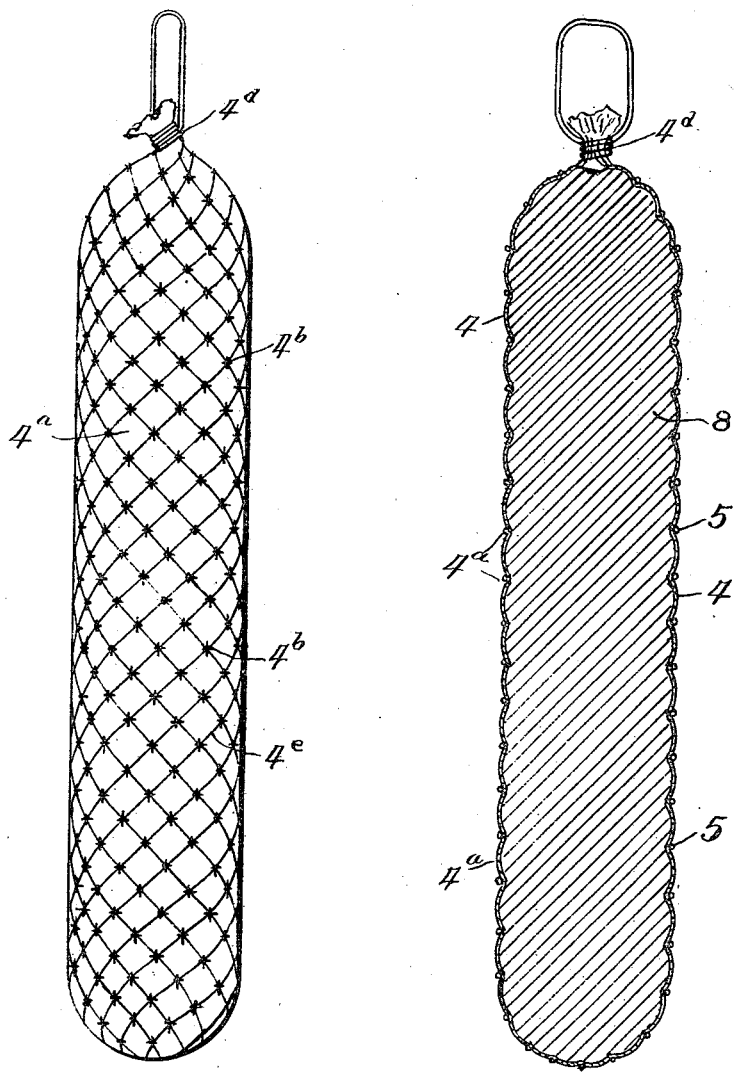

Patented Aug. 19, 1924.

1,505,218

UNITED STATES PATENT OFFICE.

LAURENCE SARTORE, OF PITTSBURGH, PENNSYLVANIA.

METHOD OF STUFFING SAUSAGE CASINGS.

Application filed March 26, 1924. Serial No. 701,889.

*To all whom it may concern:*

Be it known that I, LAURENCE SARTORE, a citizen of the United States, residing at Pittsburgh, in the county of Allegheny and State of Pennsylvania, have invented a new and useful Improvement in Methods of Stuffing Sausage Casings, of which the following is a specification.

This invention relates to a method of stuffing sausages.

In the manufacture of sausages it is usual to "twine" certain types of sausages, such as the Italian salami, or summer sausages. The twining is done after the stuffing of the sausage casing, and consists in wrapping twine around the sausage at spaced intervals and lacing by means of other lengths of twine extending longitudinally of the sausage. This twining is partially for ornamental effect; partially to provide means for hanging the sausage in storage, but is most particularly for compacting the filling of the sausage, and for pressing the sausage casing thereto in such manner that no air space may exist within the casing either initially or upon shrinkage of the filling as the sausage dries out. This latter effect is highly important in preventing spoilage of the sausage.

The operation of twining or wrapping sausages has been performed after the casings have been stuffed, and generally while the sausage is still in a moist and plastic condition in order that the wrapping of twine may indent the sausage and compact the contents thereof. The operation is slow, and requires the work of a number of persons in order to twine or wrap the sausages as rapidly as they are stuffed. The vertical laces of twine, moreover, while useful for suspending the sausages are ineffective in pressing the body of the sausage and reinforcing the casing. In twining by such method, moreover, the twine does not reinforce the sausage casing at the time when support is needed to prevent bursting, that is during the actual stuffing of the casing.

One object of the invention is to provide a method of stuffing sausages which applies a twine wrapper to the sausage casing simultaneously with the filling of the casing; thus supporting the casing against bursting during the actual stuffing operation and expediting such operation.

Another object of the invention is to provide a method of stuffing sausages which results in pressing and compacting the filling of the sausage from all directions, all the twine of the reinforcement being effective.

Figure 2:
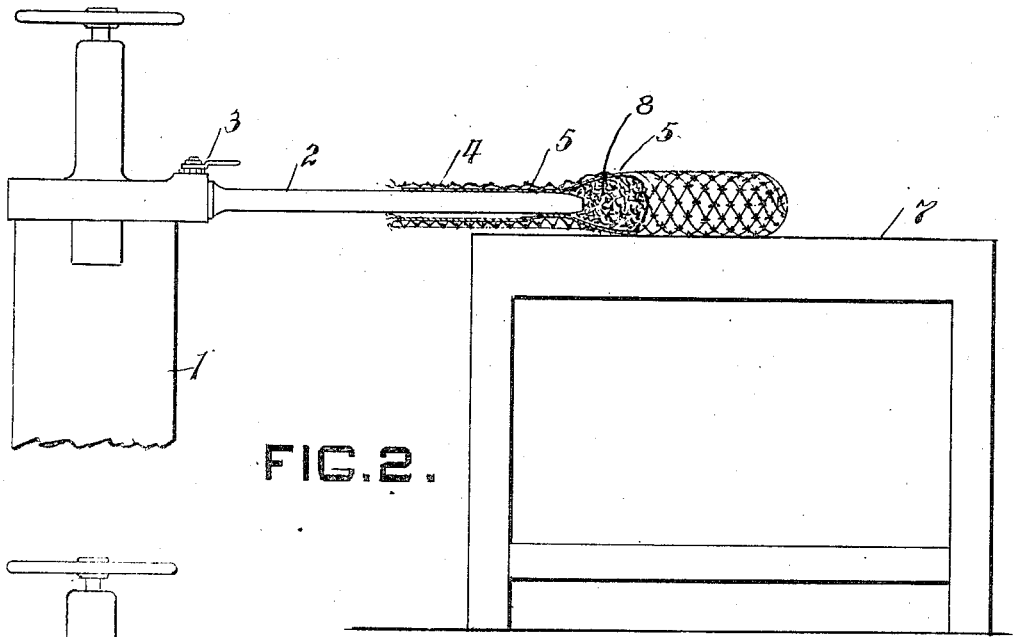
Figure 1:
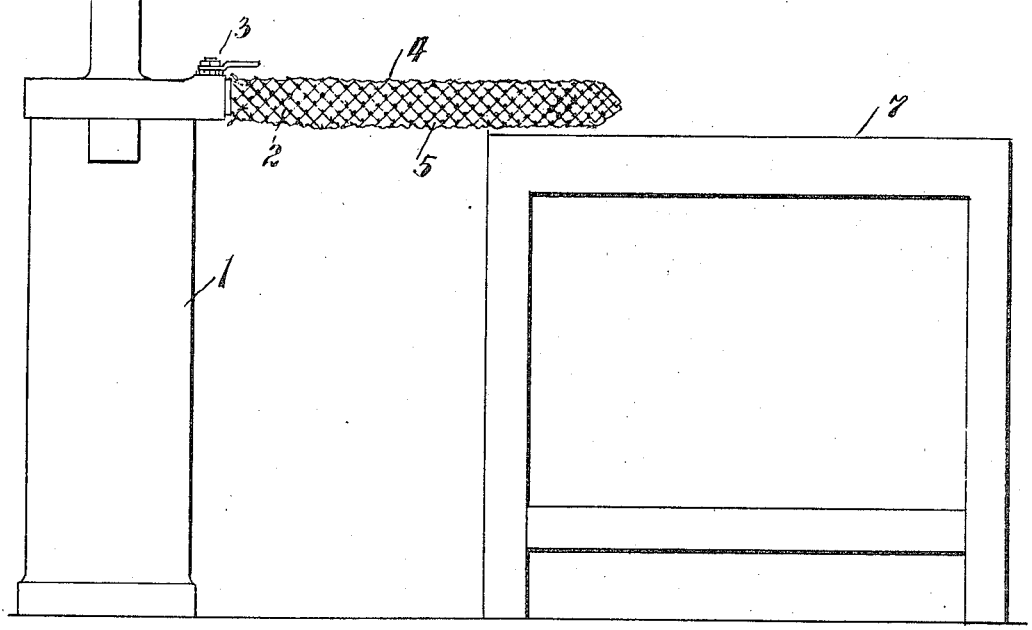

In the accompanying drawings Figure 1 is an elevation of a sausage stuffer, showing a casing and a twine wrapper therefor in position preparatory to the actual stuffing of the casing; Figure 2 is partially in elevation and partially in section of a sausage partly stuffed according to the method of the present invention; Figure 3 is an elevation of the completed sausage; and Figure 4 is a vertical sectional view of the same.

In the drawings the reference numeral 1 indicates generally a sausage stuffer, which has a filling tube or horn 2 and valve 3.

In preparation for the stuffing a reticulated tube 4, of twine or other suitable binding material, may be drawn over the casing 5 which is to be stuffed, and the two then drawn over the horn 2 of the stuffer so that the opening of the filling tube lies adjacent the further or closed end of the casing. In such case the difficulty of superimposing the limp tubular members may be obviated by inserting a rod or the like into the casing before drawing the reticulated tube thereover. When the horn of the stuffer is of favorable diameter, the sausage casing may first be drawn thereover and the reticulated tube drawn over the casing when in such position.

Upon opening the valve 3, the sausage meat or filling is deposited and packed down at the closed end of the casing 5 by the horn 2, and under the pressure exerted by the stuffer 1 expands that portion of the casing to the greatest extent permitted by the diameter and material of the casing and the diameter of the reticulated tube which surrounds it.

It should be noted that the diameter of the reticulated tube 4 is preferably less than that of the sausage casing 5 which it surrounds. As the casing is progressively filled, the body of the sausage therefore bulges out through the meshes $4^a$ of the tube. It should also be noted that the reticulated fabric of the tube or wrapper is preferably made with tied knots $4^b$, so that the cords of the wrapper do not slip with relation to each other under the pressure exerted in stuffing the sausage. It is also highly desirable that the reticulated tube be longer than the sausage casing.

As sausage meat continues to be forced into the sausage casings, the casing, together with the wrapper 4, is forced along the table 7 on which it lies and away from the sausage stuffer 1. In order that the sausage as made may not be forced out of the reticulated tube, the end of the tube at the closed end of the casing is also preferably closed before beginning the stuffing operation.

When the casings has been completely filled, the material of the open end of the casing, together with the loose ends of twine of the tube, are bunched together and bound by means of a cord or wire 4ᵈ.

The sausage immediately upon the completion of the stuffing operation comprises the filling 8 of sausage meat, the sausage casing 4, and the reticulated wrapper 5 of twine or the like embracing the sausage proper. The casing of the sausage thus formed is reinforced, and the contents of the casing compacted, both circumferentially and longitudinally of the sausage by the diagonal cords 4ᵉ of the fabric.

Although the cords of the fabric are shown as crossing and tied to each other diagonally to form substantially diamond shaped meshes, it will be readily understood that the arrangement may be such as to provide meshes which are of other shapes. It is essential only that the fabric be reticulated, of suitable diameter, and that it embrace the sausage during the operation of stuffing, in order to secure the desired advantages.

The saving in labor is marked. It will be readily seen from the above that the sausage is laced automatically as it is stuffed, thus avoiding the laborious twining operation. The actual stuffing of the sausage is conducted more rapidly, and the sausage meat packed more densely in the casing, because the casing is adequately reinforced during the actual stuffing operation.

What I claim is:

1. The method of stuffing sausages which consists in surrounding a sausage casing closed at one end with a reticulated fabric, and delivering the filling of the sausage toward the closed end of the casing.

2. The method of stuffing sausages which consists in surrounding a sausage casing closed at one end with a reticulated fabric of greater length than the casing, delivering the filling of the sausage toward the closed end of the casing, and tying the ends of the fabric to provide a closed reticulated envelope for the sausage.

3. The method of stuffing sausages which consists in surrounding a sausage casing with a tubular wrapper of reticulated fabric, such tube being of lesser diameter than the casing, and delivering the filling of the sausage progressively along the length of the casing to progressively expand the casing into close engagement with the reticulated wrapper.

4. The method of stuffing sausages which consists in surrounding a sausage casing with a tubular wrapper of reticulated fabric, such tube being of lesser diameter and greater length than the casing, delivering the filling of the sausage progressively along the length of the casing to progressively expand the casing into close engagement with the reticulated tube, and tying the ends of the fabric to provide a closed reticulated envelope for the sausage.

5. The method of stuffing sausages which consists in surrounding a sausage casing closed at one end with a tubular wrapper of reticulated fabric, such tubular wrapper being of lesser diameter than the casing, and delivering the filling of the sausage toward the closed end of the casing.

6. The method of stuffing sausages which consists in surrounding a sausage casing with a tubular wrapper of reticulated fabric, and delivering the filling of the sausage progressively along the length of the casing to progressively expand the casing into close engagement with the reticulated wrapper.

7. As an article of manufacture a sausage comprising a casing, edible filling material in the casing, and a tubular wrapper of reticulated fabric and of lesser diameter than the casing embracing the same.

In witness whereof, I hereunto set my hand.

LAURENCE SARTORE.

Witnesses:
  A. M. CHEVERIN,
  E. B. WALTERS.